United States Patent
Yu

[11] Patent Number: 5,822,179
[45] Date of Patent: Oct. 13, 1998

[54] GLASS MOTOR HOUSING HAVING REINFORCING MEMBERS

[76] Inventor: Jack Yu, No. 109-1, Avenue 6, Lane 164, Tzong Sa Road, Da Du Hsiang, Taichung Hsien, Taiwan

[21] Appl. No.: 924,422

[22] Filed: Aug. 27, 1997

Related U.S. Application Data

[63] Continuation-in-part of Ser. No. 547,037, Oct. 23, 1995, abandoned.

[51] Int. Cl.⁶ .................................................... H02K 5/04
[52] U.S. Cl. ............................................ 361/600; 310/89
[58] Field of Search ..................................... 361/600, 601; 174/137 R, 153 GM; 310/89, 91

[56] References Cited

U.S. PATENT DOCUMENTS

| | | |
|---|---|---|
| 4,760,299 | 7/1988 | Dickie et al. .............................. 310/91 |
| 4,800,309 | 1/1989 | Lakin ......................................... 310/90 |
| 5,406,448 | 4/1995 | Anderson et al. ....................... 361/600 |

Primary Examiner—Leo P. Picard
Assistant Examiner—Jayprakash N. Gandhi
Attorney, Agent, or Firm—Charles E. Baxley, Esq.

[57] ABSTRACT

A motor housing is made of glass material and includes a curved and convex reinforcing rib formed in the middle and inner peripheral portion. The reinforcing rib includes a thickness than the other portions of the motor housing for increasing the strength of the motor housing. The motor housing includes a number of stepped holes formed in the reinforcing rib and having two orifices of different sizes for engaging with the bolts and the heads of the bolts and for preventing the motor housing from being easily broken by the bolts.

1 Claim, 2 Drawing Sheets

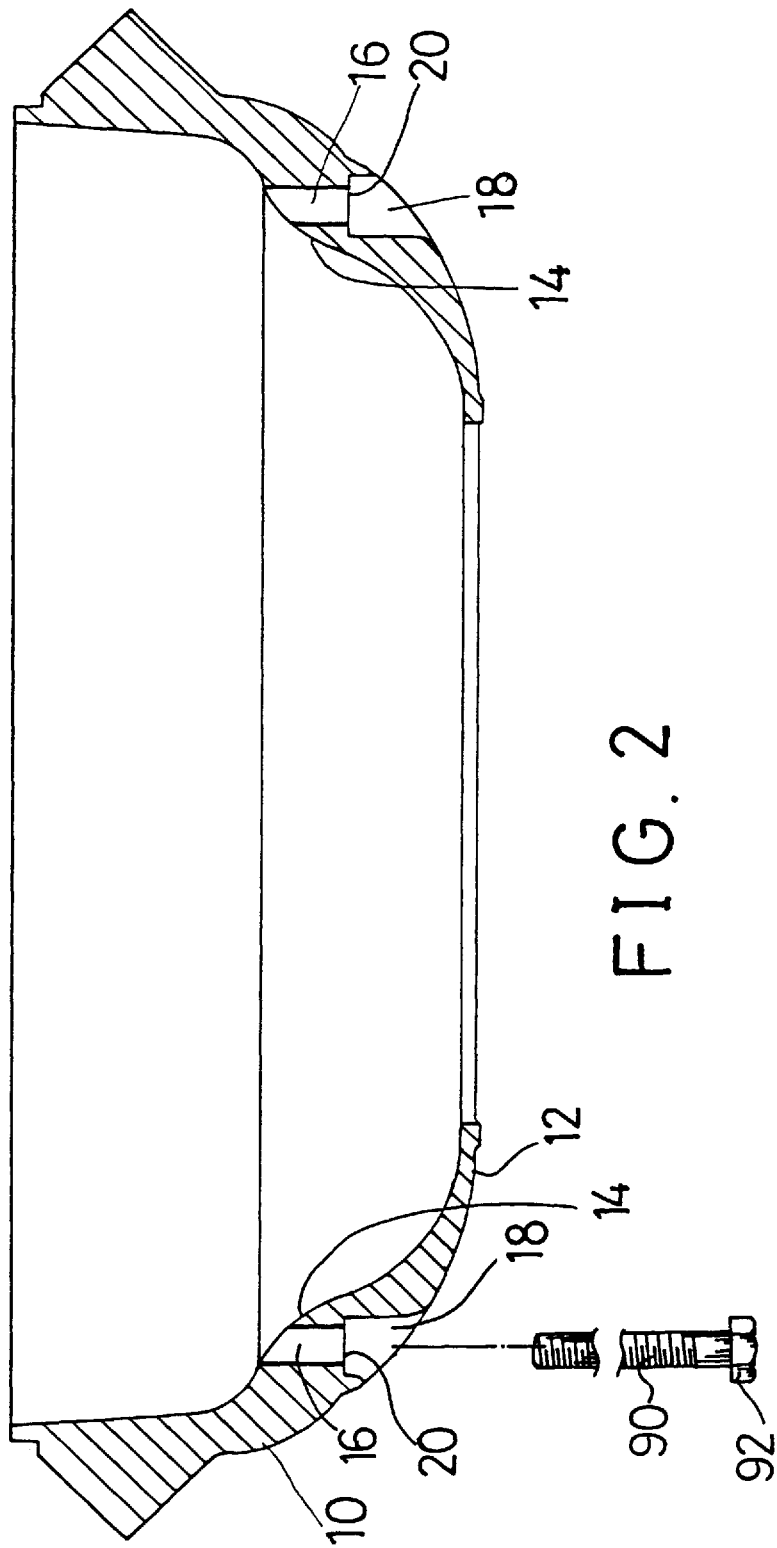

GLASS MOTOR HOUSING HAVING REINFORCING MEMBERS

The present invention is a continuation-in-part of U.S. patent application Ser. No. 08/547,037, filed Oct. 23, 1995 now abandoned.

BACKGROUND OF THE INVENTION

1. Field of the Invention

The present invention relates to a motor housing, and more particularly to a glass motor housing having a reinforcing member for preventing the glass motor housing from being easily broken.

2. Description of the Prior Art

Typical motor housings are provided for covering the motors. Three typical motor housings are disclosed in U.S. Pat. No. 4,760,299 to Dickie et al., U.S. Pat. No. 4,800,309 to Lakin, and U.S. Pat. No. 5,406,448 to Anderson et al. All of the prior motor housings are made of metal or similar material for strongly supporting the motor in place. The motor housings may not be made of glass materials due to the fragility of the glass material. In addition, the motor housing should be drilled with a number of holes for engaging with fasteners. The fasteners may also easily damage the glass motor housing and the glass motor housing will be easily broken when vibrations and shocks of the motor are transmitted to the fasteners.

The present invention has arisen to mitigate and/or obviate the afore-described disadvantages of the conventional motor housings.

SUMMARY OF THE INVENTION

The primary objective of the present invention is to provide a glass motor housing which includes a reinforcing member for preventing the motor housing from being easily broken.

In accordance with one aspect of the invention, there is provided a motor housing comprising a glass motor housing body including an upper portion and a lower portion, and including a bottom surface and including a middle and inner peripheral portion having a curved and convex reinforcing rib. The reinforcing rib includes a thickness greater than that of the upper and lower portions of the body for increase a strength of the motor housing. A plurality of stepped holes are formed in the reinforcing rib for engaging with bolts, the stepped holes each includes a first orifice for engaging with the bolt and each includes a second orifice for engaging with a head of the bolt, and each includes a flat annular shoulder formed between the first orifice and the second orifice and parallel to the bottom surface of the housing body for solidly engaging with the head of the bolt and for preventing the housing body from being damaged by the bolts.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a cross sectional view taken along lines 2—2 of FIG. 1.

DETAILED DESCRIPTION OF THE PREFERRED EMBODIMENT

Figure 1:
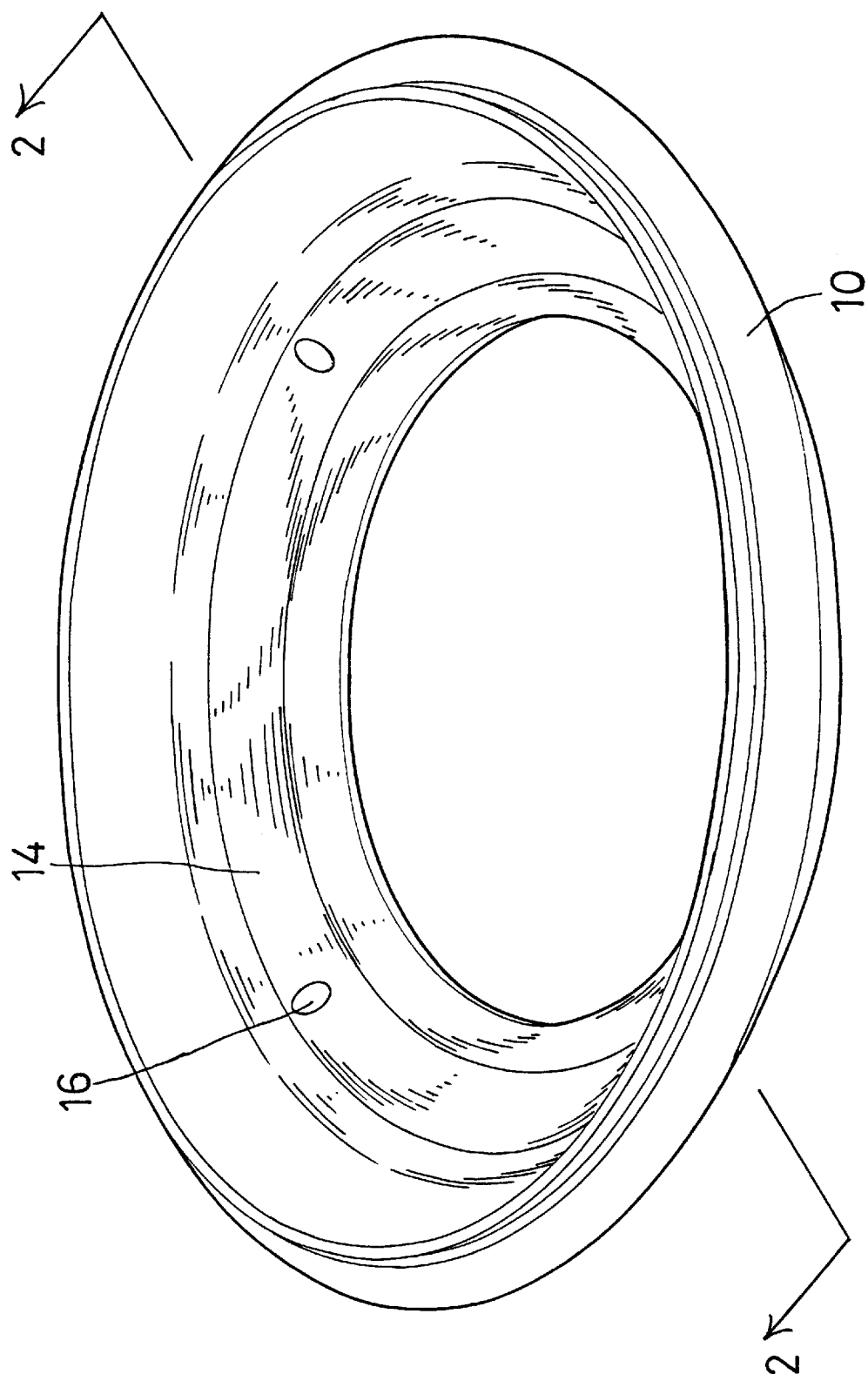
FIG. 1 is a perspective view of a motor housing in accordance with the present invention.

Referring to the drawings, a motor housing in accordance with the present invention comprises a body 10 made of glass materials and including a bottom surface. The body 10 includes a middle and inner peripheral portion having a curved and convex reinforcing rib 12. The reinforcing rib 12 includes a thickness greater than that of the other portions of the body 10, particularly the upper and the lower portions of the body 10, for increasing the strength of the body 10. A number of stepped holes 16, 18 are formed in the reinforcing rib 12 by such as molding processes. The stepped holes 16, 18 each includes a first orifice 16 of smaller size for engaging with the body of the bolt 90 and each includes a second orifice 18 having a size greater than that of the first orifice 16 for engaging with the head 92 of the bolt 90. A flat annular shoulder 20 is formed between the orifices 16, 18 and is preferably parallel to the bottom surface 12 for solidly engaging with the head 92 of the bolt and for preventing the body 10 from being broken by the bolts 90.

It is very important that the glass motor housing includes one or more reinforcing ribs for increasing the strength of the glass motor housing and for preventing the glass motor housing from being easily broken.

Accordingly, the motor housing in accordance with the present invention includes a body of glass material that has a reinforcing member for engaging with the fasteners and for preventing the motor housing from being easily broken.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A motor housing comprising:

a glass motor housing body including an upper portion and a lower portion, and including a bottom surface and including a middle and inner peripheral portion having a curved and convex reinforcing rib, said reinforcing rib including a thickness greater than that of said upper and lower portions of said body for increase a strength of said motor housing, and a plurality of stepped holes formed in said reinforcing rib for engaging with bolts, said stepped holes each including a first orifice for engaging with the bolt and each including a second orifice for engaging with a head of the bolt, and each including a flat annular shoulder formed between said first orifice and said second orifice and parallel to said bottom surface of said housing body for solidly engaging with the head of the bolt and for preventing said housing body from being damaged by the bolts.

* * * * *